United States Patent
Nakashima et al.

(10) Patent No.: US 7,612,650 B2
(45) Date of Patent: Nov. 3, 2009

(54) REMOTE CONTROL SYSTEM AND METHOD

(75) Inventors: Kazuhiro Nakashima, Obu (JP);
Kentaro Teshima, Kariya (JP); Ifushi Shimonomoto, Okazaki (JP)

(73) Assignee: DENSO Corporation, Kariya (JP)

( * ) Notice: Subject to any disclaimer, the term of this patent is extended or adjusted under 35 U.S.C. 154(b) by 595 days.

(21) Appl. No.: 11/375,195

(22) Filed: Mar. 15, 2006

(65) Prior Publication Data

US 2006/0208856 A1    Sep. 21, 2006

(30) Foreign Application Priority Data

Mar. 15, 2005    (JP)    ............................. 2005-073651
Nov. 25, 2005    (JP)    ............................. 2005-340774

(51) Int. Cl.
    *B60R 25/00*    (2006.01)
(52) U.S. Cl. .............. 340/5.72; 340/539.32; 340/539.1;
    340/426.1; 340/426.13; 340/426.16; 340/426.17;
    340/539.11; 340/10.3; 340/10.5; 340/10.1;
    701/2; 701/49
(58) Field of Classification Search ............ 340/539.32,
    340/539.1, 425.5, 426.1, 426.13, 426.16,
    340/426.17, 426.18, 539.11, 10.3, 10.5, 10.1,
    340/5.72; 307/10.2, 10.3; 701/2, 49, 36
    See application file for complete search history.

(56) References Cited

U.S. PATENT DOCUMENTS

| 5,796,178 | A | 8/1998 | Onuma | |
|---|---|---|---|---|
| 2002/0084887 | A1* | 7/2002 | Arshad et al. | 340/5.61 |
| 2003/0184431 | A1* | 10/2003 | Lundkvist | 340/5.2 |
| 2004/0017281 | A1* | 1/2004 | Dix | 340/5.61 |
| 2004/0205189 | A1* | 10/2004 | Sata et al. | 709/225 |
| 2006/0208856 | A1* | 9/2006 | Nakashima et al. | 340/5.72 |
| 2006/0255911 | A1* | 11/2006 | Taki et al. | 340/5.72 |

FOREIGN PATENT DOCUMENTS

| DE | 40 20 445 C2 | 12/1998 |
|---|---|---|
| JP | 2000-104429 | 4/2000 |

* cited by examiner

*Primary Examiner*—Daryl Pope
(74) *Attorney, Agent, or Firm*—Nixon & Vanderhye P.C.

(57) ABSTRACT

Each of a portable device and an in-vehicle unit is provided with respective GPS receivers to determine a portable device position and a vehicle position. The portable device transmits a response signal including the portable device position in response to a request signal of the in-vehicle unit. The in-vehicle unit, only in a case where it is determined that the portable device position included in the response signal is within a predetermined area around the vehicle position, performs control of a lock/unlock state of a vehicle door in accordance with the identification result of the ID code included in the response signal. Accordingly, it is surely prevented that the door is remotely controlled by the portable device at far distances from the vehicle.

12 Claims, 9 Drawing Sheets

FIG. 13

REMOTE CONTROL SYSTEM AND METHOD

CROSS REFERENCE TO RELATED APPLICATION

This application is based on Japanese Patent Applications No. 2005-73651 filed on Mar. 15, 2005 and No. 2005-340774 filed on Nov. 25, 2005, the disclosures of which are incorporated herein by reference.

FIELD OF THE INVENTION

The present invention relates to a remote control system such as a vehicular device control system and method of remote control, which perform an interactive communication between a user-carried portable device and an in-vehicle unit to control a vehicle-mounted device for a vehicle based upon the result of the interactive communication.

BACKGROUND OF THE INVENTION

A conventional remote control system such as a vehicle entry control system controls a lock/unlock state of each door based upon the identification result of an ID code by intercommunication between a portable electronic key (a portable device) and an in-vehicle unit.

In such a system, an electric wave strength of a request signal transmitted from the in-vehicle unit or the like is adjusted in advance so that a reach range of the request signal is within a predetermined area in the circumference of the vehicle. As a result, a detection area of the portable electronic key is set in the circumference of the vehicle to always monitor an approach of a holder of the portable electronic key to the vehicle.

However, the request signal from the in-vehicle unit may be relayed by using a plurality of additional communication devices, making it possible to communicate the portable electronic key placed out of that area with the in-vehicle unit. In this case, even when a user carrying the portable electronic key is at a distance away from the vehicle, it is possible to unlock a door without the user's recognition.

In order to prevent this problem, German Patent No. 4020445 proposes a system, which is based on the finding that, in a case of enlarging a reach area of the request signal, a request time from a time point when the in-vehicle unit transmits the request signal to a time point when the in-vehicle unit receives the response signal from the portable electronic key increases. Therefore, in this system, a time limitation is imposed on receiving the response signal, so that the in-vehicle unit is adapted to receive only a response signal, which arrives within a waiting time corresponding to the detection area after the in-vehicle unit transmits the request signal. As a result, the door is designed not to be unlocked even if the in-vehicle unit receives the response signal at a time point exceeding the waiting time limitation.

However, imposing only a time limitation on receiving the response signal still has the following problem. That is, in a case where the plurality of the above communication devices can perform communication processing nearly without time delay, there is a possibility that the response signal from the portable electronic key at a remote area from the vehicle arrives within a waiting time of the response signal.

SUMMARY OF THE INVENTION

The present invention addresses this problem and has an object of providing a remote control system and method capable of surely preventing a control device from being controlled in response to a response signal from a portable device at a remote area from the vehicle.

According to an aspect of the present invention, a control object such as a vehicle and a portable device communicates interactively. Portable device information related to a position of the portable device is provided by the portable device and control object information related to a position of the control object is provided by the control object. Based on these portable device information and the control object information, it is determined whether the portable device is within a predetermined distance from the control object. Only when the portable device is determined to be within the predetermined distance, remote control on the control object by the portable device is permitted.

BRIEF DESCRIPTION OF THE DRAWINGS

Other objects, features, and advantages of the present invention will become more apparent from the following detailed description made with reference to the accompanying drawings, in which like parts are designated by like reference numbers. In the drawings.

DETAILED DESCRIPTION OF THE PREFERRED EMBODIMENTS

The present invention will be described in more detail with reference to various embodiments, in which a remote control system is implemented as a vehicular device control system.

First Embodiment

Figure 1:
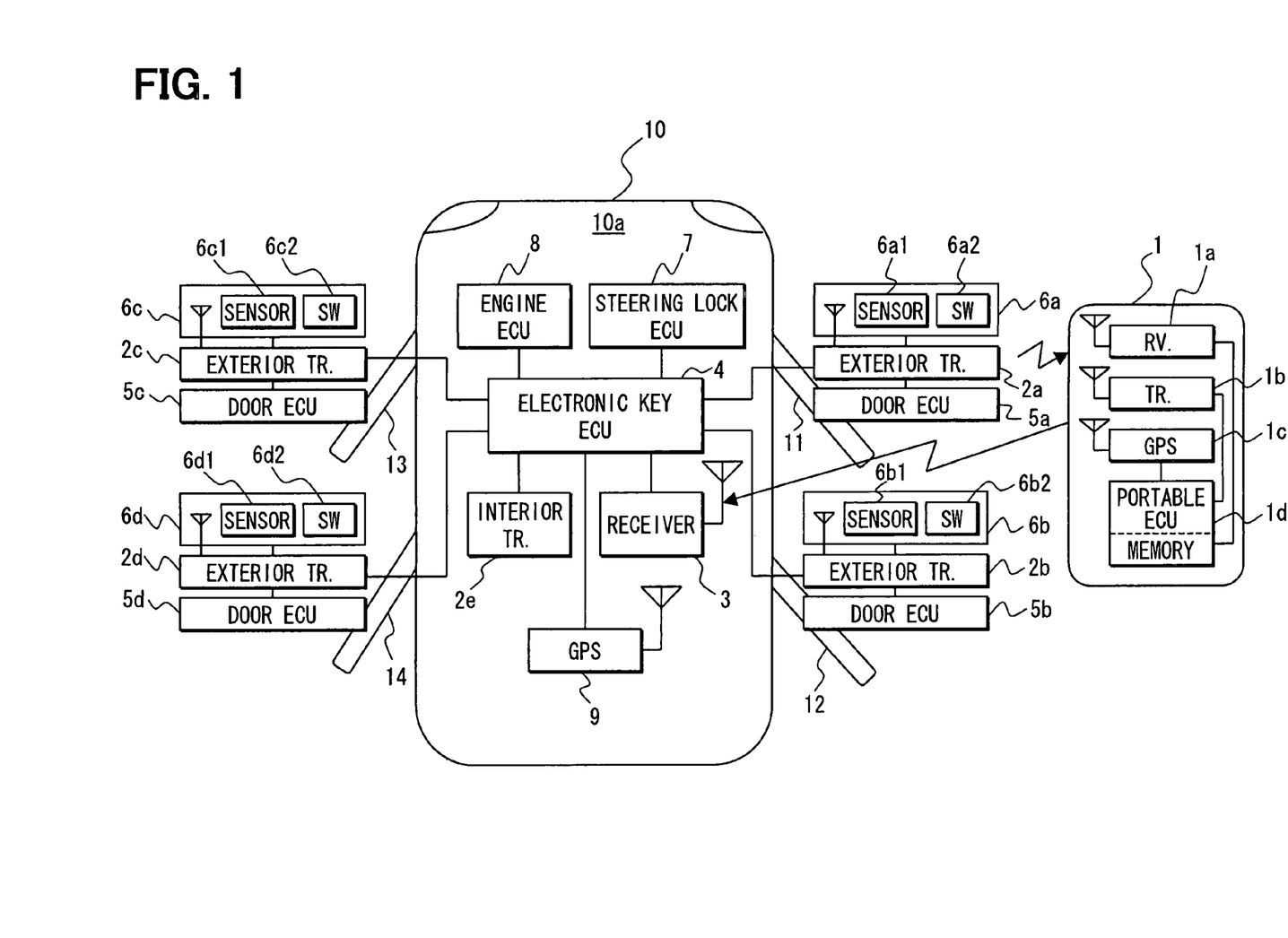
FIG. 1 is a schematic block diagram showing a vehicular device control system as a remote control system in a first embodiment of the present invention.

Referring to FIG. 1, a vehicular device control system has a portable device (electronic key) 1 and an in-vehicle unit 10a mounted in a vehicle 10. The portable device 1 is carried by a user such as a vehicle owner or a vehicle driver. The in-vehicle unit 10a includes an electronic key ECU (electronic control unit) 4, which controls a lock/unlock state of each door based upon the identification result of an ID code by interactive communication with the portable device 1. In addition, the electronic key ECU 4 also performs, in order to improve security of the vehicle 10, controls of a steering lock state and permission/prohibition of an engine start for the vehicle 10.

The portable device 1 includes a radio receiver 1a for receiving request signals from exterior transmitters 2a to 2d outside of a vehicle compartment or an interior transmitter 2e. The portable device 1 includes a radio transmitter 1b for transmitting a response signal including an ID code in response to reception of the request signal. The portable device 1 further includes a GPS receiver 1c, which, as well known, receives a GPS signal from a plurality of GPS satellites located above the earth which periodically transmit navigation data necessary for measurement, such as orbit information of the satellites or time information toward the earth.

The portable device 1 further includes a portable device ECU 1d connected to the receiver 1a, the transmitter 1b and the GPS receiver 1c for performing various control processing.

More specially, the portable device ECU 1d determines presence/absence of reception of the request signal based upon a receiving signal of the receiver 1a, calculates a position (latitude/longitude) of the portable device 1 based upon the GPS signal, and further generates a response signal including the calculated position of the portable device 1, the ID code and the like to transmit the generated response signal from the transmitter 1b.

The in-vehicle unit 10a is provided with the transmitters 2a to 2d located in respective doors 11 to 14 of the vehicle 10 and the transmitter 2e. These transmitters 2a to 2d and the transmitter 2e each transmit a request signal based upon a transmission instruction signal from the electronic key ECU 4, which is a major part of the in-vehicle unit 10a. The reach distance of the request signal of each transmitter 2a to 2d is set as, for example, about 0.7 to 1.0 meters.

Accordingly, at a parking time of a vehicle 10, a detection area corresponding to the reach distance of the request signal is defined in the circumference of each door 11 to 14 for the vehicle 10, thereby detecting that a holder of the portable device 1 is getting close to the vehicle 10. In addition, a detection area by the transmitter 2e is set to cover only an inside of the vehicle 10 to detect whether the portable device 1 is inside of the vehicle 10.

The in-vehicle unit 10a is provided inside a vehicle compartment of the vehicle 10, and includes a radio receiver 3 which is adapted to be capable of receiving the response signal in synchronization with an output of a transmission instruction signal to each of the transmitters 2a to 2e for receiving the response signal transmitted from the portable device 1. The response signal which the receiver 3 has received is outputted to the electronic key ECU 4. The electronic key ECU 4 determines based upon the position of the portable device and the ID code included in the received response signal whether a control of a lock/unlock state of the door is performed.

Further, the in-vehicle unit 10a is equipped with a GPS receiver 9 as in the portable device 1 and is capable of receiving GPS signals from GPS satellites. The GPS signals received by the GPS receiver 9 are outputted to the electronic key ECU 4, thereby calculating a vehicle position by the electronic key ECU 4.

In addition, the in-vehicle unit 10a is constructed to control each door 11 to 14 for the vehicle 10, and locks or unlocks each door 11 to 14. Therefore, the in-vehicle unit 10a further includes door ECUs 5a to 5d, which set each door 11 to 14 at an unlock standby state where the door can be unlocked by a holder of the portable device 1 contacting a door outside handle (a door handle). The door ECUs 5a to 5d operate in response to an instruction signal from the electronic key ECU 4.

The door handles 6a to 6d of the respective doors 11 to 14 for the vehicle 10 are provided with touch sensors 6a1 to 6d1, which are capable of detecting that a holder of the portable device 1 touches the door handles 6a to 6d. In addition, the door handles 6a to 6d are provided with door lock switches 6a2 to 6d2 as push switches. The respective doors 11 to 14 can be locked by operating the door lock switches 6a2 to 6d2. Further, the door handles 6a to 6d serve as antennas of the transmitters 2a to 2d.

The in-vehicle unit 10 may be equipped with a steering lock ECU 7 and an engine ECU 8 for improving security of the vehicle 10. The steering lock ECU 7 and the engine ECU 8 switches on/off the steering lock or perform switching control of permission/prohibition to an engine start for the vehicle 10 based upon an instruction signal from the electronic key ECU 4.

Next, the processing for performing controls of lock/unlock states of each door by the electronic key ECU 4 based upon the identification result of the ID code by the interactive communication between the in-vehicle unit 10*a* and the portable device 1 will be described with reference to flow charts in FIGS. 2 and 3.

Figure 2:
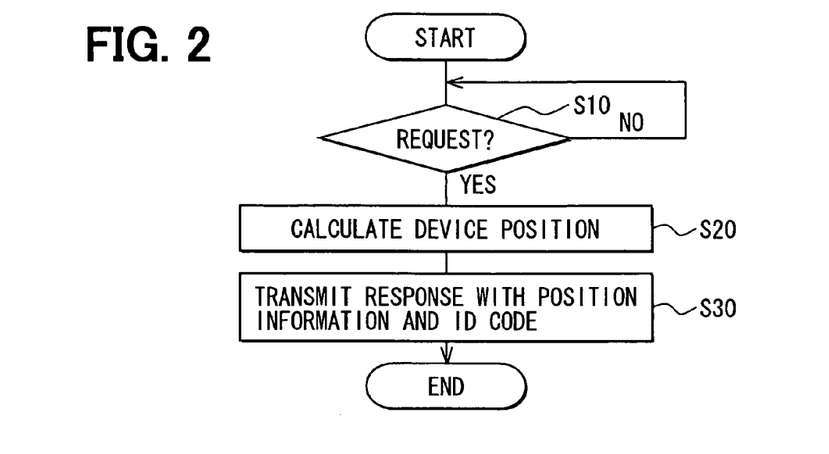
FIG. 2 is a flow chart showing processing executed in a portable device, in which an electronic key ECU performs control of a lock/unlock state of each door based upon the identification result of the ID code by interactive communication between the in-vehicle unit and the portable device for the vehicular device control system in the first embodiment.

As shown in FIG. 2, at step S10, it is determined based upon a receiving signal of the receiver 1*a* whether the request signal is received from the in-vehicle unit 10*a*. In a case where it is determined in this determination processing that the request signal is not received, the execution of the subsequent processing is set in a waiting condition until the request signal is received. On the other hand, in a case where it is determined that the request signal is received, the process proceeds to step S20.

At step S20, a position of the portable device 1 is calculated based upon a GPS signal received by the GPS receiver 1*c*. At the subsequent step S30, the portable device ECU 1*d* generates a response signal including a portable device position information indicating the position of the portable device 1 calculated at step S20 and also an ID code, and transmits the response signal by the transmitter 1*b*.

Figure 3:
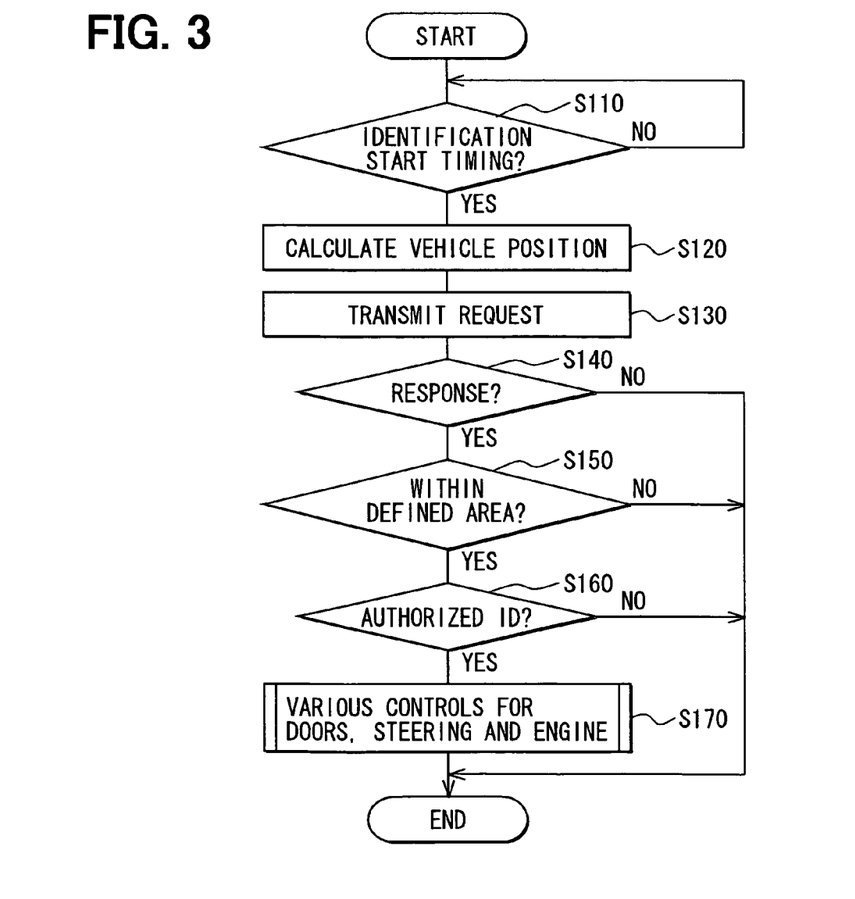
FIG. 3 is a flow chart showing processing executed in the in-vehicle unit, in which the electronic key ECU performs control of the lock/unlock state of each door based upon the identification result of the ID code by interactive communication between the in-vehicle unit and the portable device for the vehicular device control system in the first embodiment.

In the in-vehicle unit 10*a*, as shown in FIG. 3, it is determined at step S10 whether a vehicle state is appropriate for timing to start the identification of the ID code. More specially, when an engine for the vehicle 10 stops and vehicle 10 is parked in a state where each door 11 to 14 is locked, it is determined that the vehicle state is appropriate for the timing to start the identification of the ID code of each transmitter 2*a* to 2*d* for each determined time elapse, thereby instructing transmission of the request signal to the transmitters 2*a* to 2*d*. On the other hand, in regard to the transmitter 2*e*, it is determined that an engine start time, a point of operating the door lock switch or the like is the timing to start the identification of the ID code, thereby instructing transmission of the request signal to the transmitter 2*e*.

At step S110, when it is determined that the vehicle state is not appropriate for the timing to start the identification, the identification operation is waited for until the identification start timing. When it is determined that the vehicle state is appropriate for the timing to start the identification, the process proceeds to step S120, wherein a stop position of the vehicle is calculated based upon the GPS signal received by the GPS receiver 9.

At the subsequent step S130, a transmission instruction signal is outputted to the transmitters 2*a* to 2*d* and the transmitter 2*e* to transmit the request signal. At step S140, it is determined whether a response signal is received from the portable device 1 in response to the request signal. The response signal from the portable device 1 includes the portable device position information indicating the position of the portable device 1 and the ID code. When the response signal is not received, it is assumed that the portable device 1 is not within the detection area and this processing (FIG. 2) ends. On the other hand, when the response signal is received from portable device 1, the process proceeds to step S150.

At step S150, it is determined whether the position of the portable device 1 is within a defined area defined on the basis of the vehicle position based upon the portable device position information included in the received response signal and the vehicle stop position information calculated at step S120. This defined area is set to correspond to the detection area of each transmitter 2*a* and 2*e*. In the determination processing at step S150, in a case where the portable device position is within the defined area, the received response signal is assumed as an authorized response signal. Thus, the process proceeds to step S160.

On the other hand, in a case where the portable device position is out of the defined area, there is the possibility that the interactive communication distance between the portable device and the in-vehicle unit is lengthened on purpose, the processing shown in FIG. 2 ends. Therefore, the control of the lock/unlock state in each door is not performed.

At step S160, it is determined whether a predetermined relation is satisfied, for example, the ID code included in the response signal corresponds to the pre-registered ID code (YES/NO determination as to the identification of the ID code). When it is determined that, in the determination processing, the ID code is the authorized one, the process proceeds to step S170. When it is determined that in the determination processing, the ID code is not the authorized one, the process ends.

At step S170, various controls such as control of the lock/unlock states of each door, control of the steering lock state or control of the engine start permission are performed.

For example, when the electronic key ECU 4 determines that a position of a holder of the portable device 1 is outside of the vehicle 10 by using the response code or the like provided to each transmitter 2*a* to 2*e*, the electronic key ECU 4 provides an instruction signal to the corresponding one of the door ECUs 5*a* to 5*d* so that the lock of the door at a position corresponding to the position of the holder is to be in an unlock standby state. One of the door ECUs 5*a* to 5*d*, which has received the instruction signal sets the corresponding one of the doors 11 to 14 to be in an unlock standby state based upon the instruction signal.

When either one of the door ECUs 5*a* to 5*d* sets the corresponding one of the doors 11 to 14 to an unlock standby state based upon the instruction signal from the electronic key ECU 4, one of the touch sensors 6*a*1 to 6*d*1 detects that the holder of the portable device 1 touches one of the door handles 6*a* to 6*d*, thereby transmitting the information to the electronic key ECU 4. In this case, the electronic key ECU 4 instructs each of the door ECUs 5*a* to 5*d* in such a way as to unlock all the doors 11 to 14. Accordingly, when the holder of the portable device 1 performs a door-opening operation for opening a door, all the doors 11 to 14 are automatically unlocked.

However, the door-opening operation by the holder of the portable device 1 may be detected not by the touch sensors 6*a*1 to 6*d*1 but by other detection mechanisms for mechanically detecting that the door handle 6*a* to 6*d* is operated by a user. In addition, an unlock button may be disposed in the door handle and the start of the door-opening operation may be detected by an operation of the unlock button. When the ID code is identified, all the doors may be set at an unlock standby state.

When the holder of the portable device 1 opens and closes the door to get in the vehicle 10 and operates an engine switch of the vehicle 10, the electronic key ECU 4 makes an interactive communication with the portable device 1 by using the transmitter 2*e* and the receiver 3 located inside the vehicle compartment and again performs the identification of the ID code. On the other hand, the steering lock ECU 7 confirms to the electronic key ECU 4 whether the steering lock is permitted to be lifted. When the ID code is the authorized one, the electronic key ECU 4 makes to the steering lock ECU 7 a response to permit lift of the steering lock. The steering lock ECU 7 unlocks the steering lock based upon the response. In this way, the control of the steering lock state is performed.

Further, at this time point the electronic key ECU 4 outputs an instruction signal to the engine ECU 8 for lifting a start prohibition of the engine.

By such control, the holder of the portable device 1 can perform operations from vehicle boarding by a door unlock to the engine start without using the portable device 1 with the holder's hand.

On the other hand, when the vehicle 10 stops, the engine switch is turned off and it is confirmed that the holder of the portable device 1 gets off the vehicle 10 based on that the portable device 1 does not communicate with the transmitter 2e but communicate with one of the transmitters 2a to 2d, the electronic key ECU 4 outputs an instruction signal to each of the door ECUs 5a to 5d for locking each of the doors 11 to 14 in the vehicle 10 in response to operating either one of the door lock switches 6a2 to 6d2 located in the door handles 6a to 6d. The electronic key ECU 4 instructs the execution of the door lock. The ECU 4 also instructs the execution of the steering lock to the steering lock ECU 7 and also setting of the start prohibition of the engine to the engine ECU 8.

However, the lock of each door 11 to 14 by the holder of the portable device 1 may be performed by other means such as a touch sensor for door lock without the door lock switches 6a2 to 6d2.

As described above, in the first embodiment, each of the portable device 1 and the in-vehicle unit 10a includes the GPS receivers 1c and 9 to determine the portable device position and the vehicle position. As long as it is determined that the portable device position obtained from the position information included in the response signal transmitted from the portable device 1 is within the defined area defined on the basis of the vehicle position, the control of the lock/unlock state of the vehicle door is performed in response to the identification result of the ID code included in the response signal in the in-vehicle unit 10a. The relation between the portable device position and the vehicle position is thus used. Thereby, it is surely prevented to execute the control of the lock/unlock state of the vehicle door in response to the response signal of the portable device 1 positioned at far distances from the vehicle 10.

Second Embodiment

The vehicular device control system in the second embodiment differs from the vehicular device control system in the first embodiment in that a relation between a portable device position and a vehicle position is determined by a portable device 1. The processing of both the portable device 1 and the in-vehicle unit 10a in the second embodiment will be described with reference to flow charts in FIGS. 4 and 5 with respect to differences from the first embodiment. It is noted that steps S210 to S260 in FIG. 4 correspond to steps S110 to S140 and S160 to S170 in FIG. 3, respectively. Further steps S310, S320 and S340 in FIG. 5 correspond to steps S10 to S30 in FIG. 2, respectively.

Figure 4:
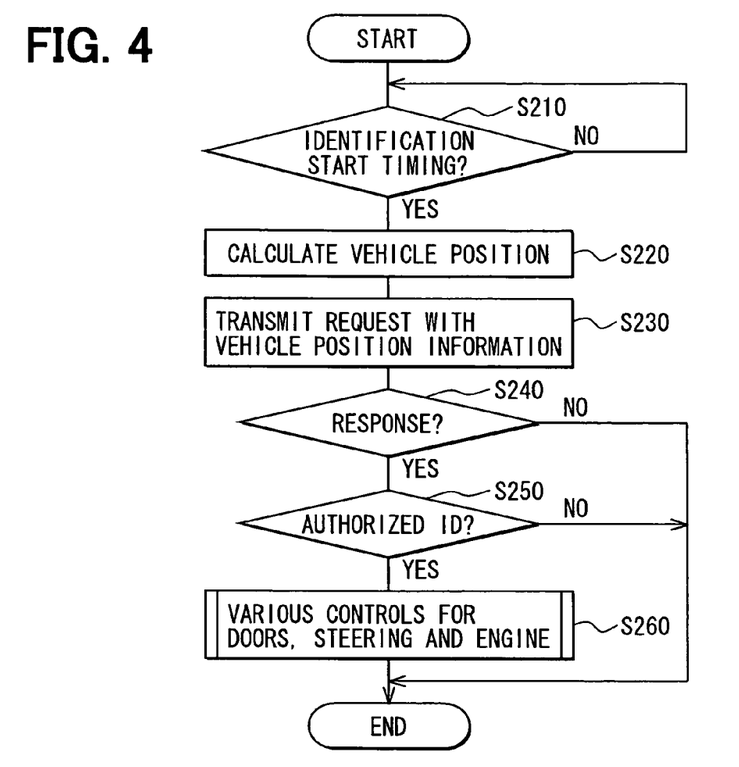
FIG. 4 is a flow chart showing processing executed in the in-vehicle unit, in which the electronic key ECU performs control of the lock/unlock state of each door based upon the identification result of the ID code by interactive communication between the in-vehicle unit and the portable device for the vehicular device control system in a second embodiment of the present invention.

A first difference is an addition of vehicle position information showing a stop position of the vehicle calculated at step S220 at a point of transmitting the request signal at step S230. As a result, the portable device 1 receives the request signal, thereby making it possible to obtain the stop position of the vehicle.

A second difference is that the determination processing (S150 in FIG. 3) in regard to whether the position of the portable device 1 is within the defined area defined on the basis of the vehicle position is eliminated from the processing of the in-vehicle unit 10a. This is because in the second embodiment the relation between the portable device position and the vehicle position is adapted to be determined at the portable device 1. As a result, it is not necessary to carry out the determination processing at the in-vehicle unit 10a.

Figure 5:
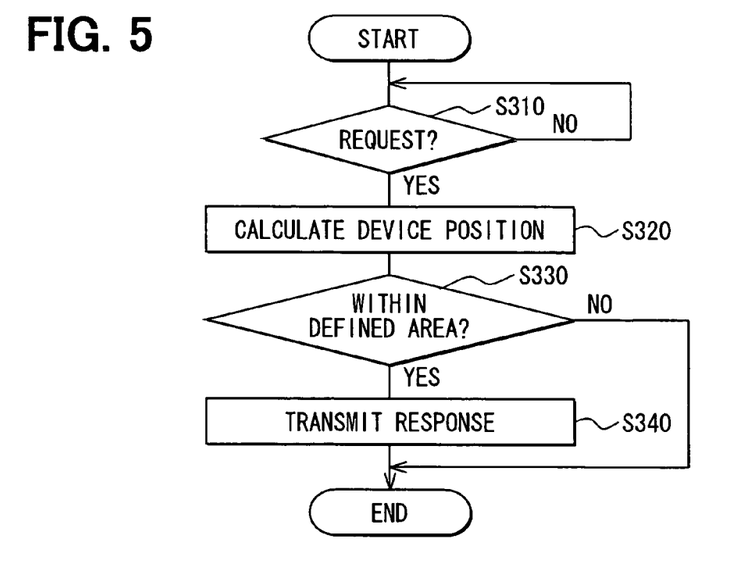
FIG. 5 is a flow chart showing processing executed in the portable device, in which the electronic key ECU performs control of the lock/unlock state of each door based upon the identification result of the ID code by interactive communication between the in-vehicle unit and the portable device for the vehicular device control system in the second embodiment.

In the portable device 1, as shown in FIG. 5, a determination is made as to presence/absence of reception of the request signal at step S310 as in the first embodiment. The portable device position is calculated at step S320. However, the second embodiment differs from the first embodiment in that the request signal received in the portable device 1 includes stop position information of the vehicle 10.

At step S330, it is determined whether the stop position of the vehicle 10 is within the defined area defined on the basis of the portable device 1, based upon the stop position information of the vehicle 10 included in the request signal and the portable device position calculated at step S320. The defined area is also set to correspond to the detection area of each of the transmitters 2a to 2e disposed in the vehicle 10.

In a case where it is determined in the determination processing at step S330 that the stop position of the vehicle 10 is within the defined area, since the received request signal is assumed as an authorized request signal, the transmission processing of the response signal is carried out at step S340. On the other hand, in a case where it is determined in the determination processing at step S330 that the stop position of the vehicle is out of the defined area, regardless of the portable device 1 is at a distance from the vehicle, there is the possibility that an interactive communication distance between the portable device 1 and the in-vehicle unit 10a is lengthened on purpose. Therefore, the transmission processing of the response signal is not carried out and the processing shown in FIG. 5 ends.

Accordingly, in a case where the portable device 1 is at a distance from the vehicle 10, the portable device 1 does not transmit the response signal in response to the request signal. Therefore, when the portable device 1 is not near the vehicle 10, the portable device 1 does not transmit the response signal in response to the request signal. Therefore, it is surely prevented that the control of the lock/unlock state for the vehicle door or the like is performed in response to the response signal of the portable device 1 at far distances from the vehicle.

Third Embodiment

In the vehicular device control system in the third embodiment, the portable device 1 is provided with a memory such as a nonvolatile memory for storing a stop position of a vehicle obtained at a time point when an engine of the vehicle stops. A memory inside the portable device ECU 1d may be used.

The portable device 1 is adapted to determine the relation between the stop position of the vehicle and the portable device position by comparing the stored stop position of the vehicle with the portable device position obtained from the GPS signal.

The processing of both the portable device 1 and the in-vehicle unit 10a in the third embodiment will be described with reference to flow charts in FIGS. 6 to 9.

Figure 6:
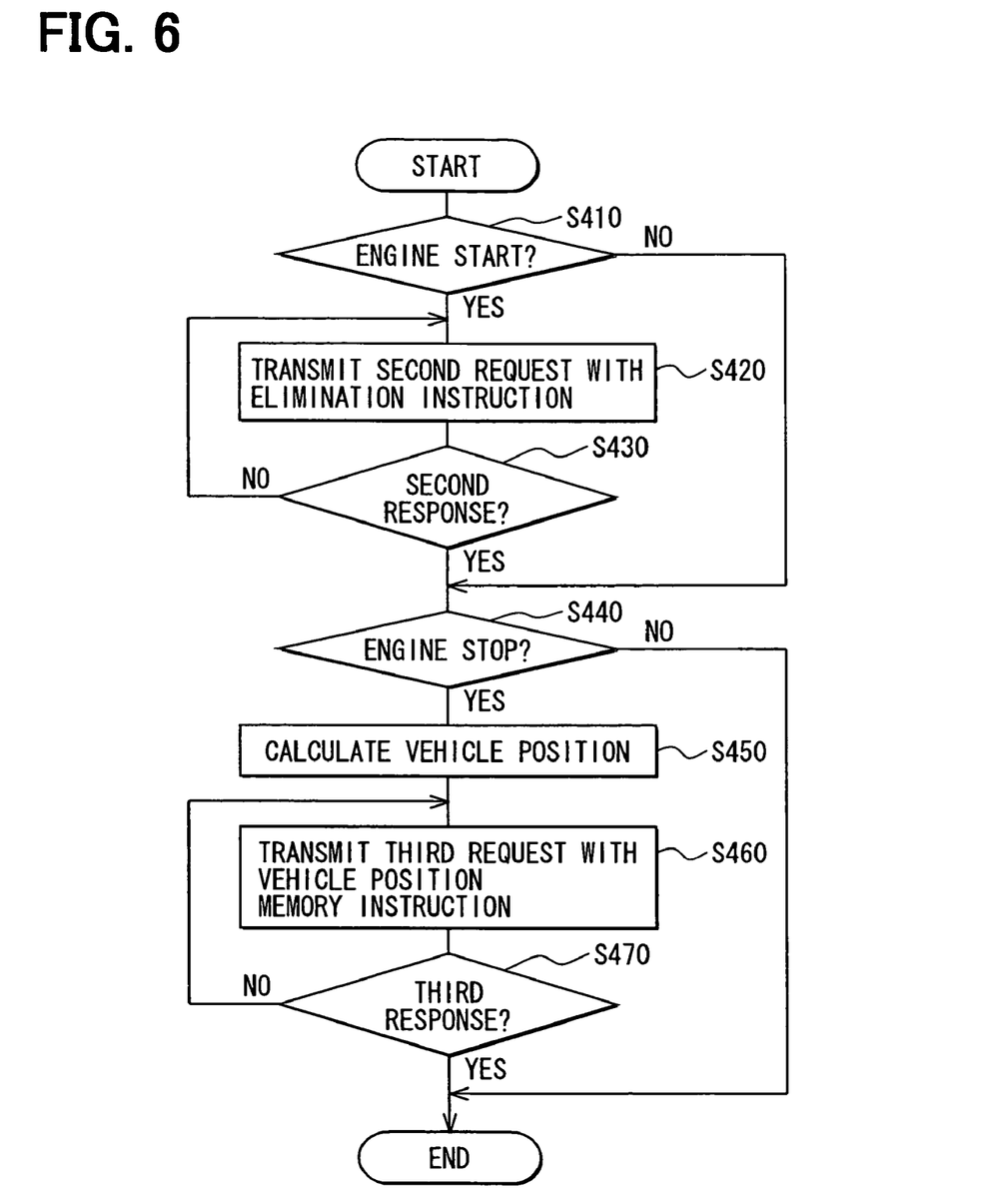
FIG. 6 is a flow chart showing processing of a memory of a stop position of a vehicle in the in-vehicle unit and elimination thereof for a vehicular device control system in a third embodiment of the present invention.

The processing for storing and eliminating the stop position of the vehicle 10 in the in-vehicle unit 10a is shown in FIG. 6. At step S410, it is determined based upon the operation position of, for example, the engine switch whether the engine is started for driving a vehicle. In the determination processing, when a positive determination is made, the process proceeds to step S420. In a case of storing the stop position of the vehicle 10, a second request signal for instructing elimination of the stored stop position is transmitted to the portable device 1. When the portable device 1 receives the second request signal, the portable device 1 performs the memory data elimination processing of the stop position and also returns a second response signal.

At step S430, it is determined whether the second response signal is received. When the second response signal is not received, it is assumed that the memory elimination of the stop position of the vehicle is not performed. The process returns to step S420, wherein the second request signal is again transmitted.

On the other hand, when the engine is not in the engine starting time at step S410, the process proceeds to step S440. It is determined whether the engine is stopped to stop the vehicle 10. When a positive determination is made at step S440, the process proceeds to step S450, wherein a vehicle position at a vehicle stop time, i.e., a stop position of the vehicle 10 is calculated based upon the GPS signals.

At step S460, a third request signal for instructing the memory of the stop position of the vehicle 10, including the stop position information showing the detected stop position of the vehicle 10, is transmitted to the portable device 1. When the portable device 1 receives the third request signal, the portable device 1 stores the stop position of the vehicle 10 based upon the stop position information included in the third request signal and also returns a third response signal.

At step S470, it is determined whether the third response signal is received. When the third response signal is not received, it is assumed that the stop position of the vehicle is not stored in the memory. The process returns to step S460, wherein the third request signal is again transmitted.

Figure 7:
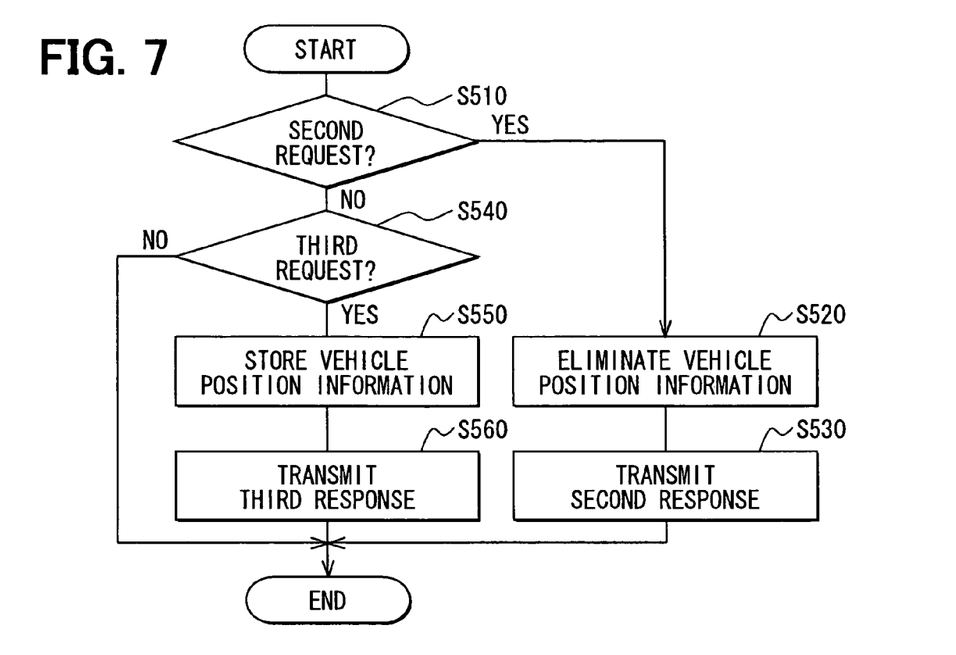
FIG. 7 is a flow chart showing processing of a memory of a stop position of a vehicle in the portable device and elimination thereof for the vehicular device control system in the third embodiment.

On the other hand, in the portable device 1, as shown in FIG. 7, it is determined at step S510 whether the second request signal is received. When it is determined in the determination processing that the second request signal is received, the process proceeds to step S520, wherein the memory elimination processing of the stop position information stored in the memory is performed. Thereafter, at step S530, the second response signal is transmitted to notify the in-vehicle unit 10a that the memory of the stop position information is eliminated.

When it is determined at step S510 that the second request signal is not received, the process proceeds to step S540, wherein it is determined whether the third request signal is received. When it is determined in the determination processing that the third request signal is received, the process proceeds to step S550, wherein the stop position of the vehicle is stored in the memory by using the stop position information of the vehicle 10 included in the third request signal. Thereafter, at step S560, the third response signal is transmitted to notify the in-vehicle unit 10a that the stop position of the vehicle is stored.

When the engine of the vehicle 10 is started, the in-vehicle unit 10a transmits the second request signal to eliminate the stored stop position of the vehicle 10. This is because if the stop position of the vehicle 10 is left in the memory without being eliminated, when the stop position of the vehicle 10 changes, the response signal cannot be transmitted from the portable device 1.

Figure 8:
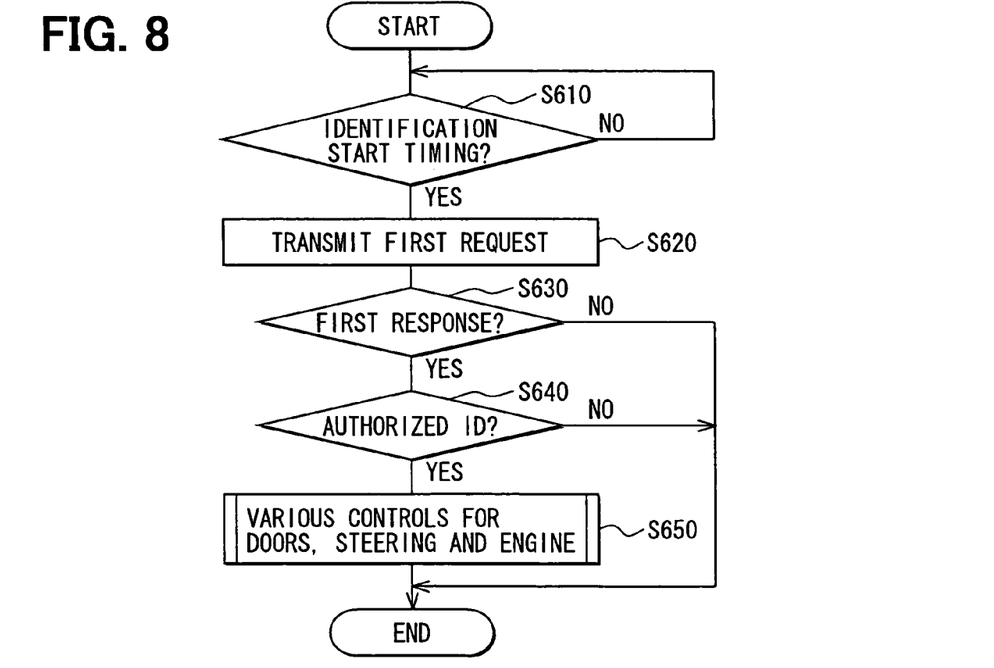
FIG. 8 is a flow chart showing processing executed in the in-vehicle unit, in which the electronic key ECU performs control of the lock/unlock state of each door based upon the identification result of the ID code by interactive communication between the in-vehicle unit and the portable device for the vehicular device control system in the third embodiment.

The in-vehicle unit 10a executes normal processing shown in FIG. 8. This processing is mostly in common with the processing of FIG. 3 in the first embodiment. Specifically, steps S610 to S650 in FIG. 8 correspond to steps S110, S130, S140, S160 and S170, respectively. The normal processing of the in-vehicle unit 10a in the third embodiment differs from the processing of the in-vehicle unit 10a in the first embodiment in that the calculation processing (step S120 in FIG. 3) of the stop position information of the vehicle 10 is eliminated and the determination processing (step S150 in FIG. 3) of the relation between the portable device position and the vehicle position is eliminated. This is because, since the stop position of the vehicle 10 is already stored in the portable device 1 when the vehicle stops the engine, it is not required to determine the stop position of the vehicle 10 in the normal processing again. This is further because, since the relation between the stop position of the vehicle 10 and the portable device position is determined in the portable device 1, the determination processing of the relation between the portable device position and the vehicle position in the in-vehicle unit 10a is not necessary either.

Figure 9:
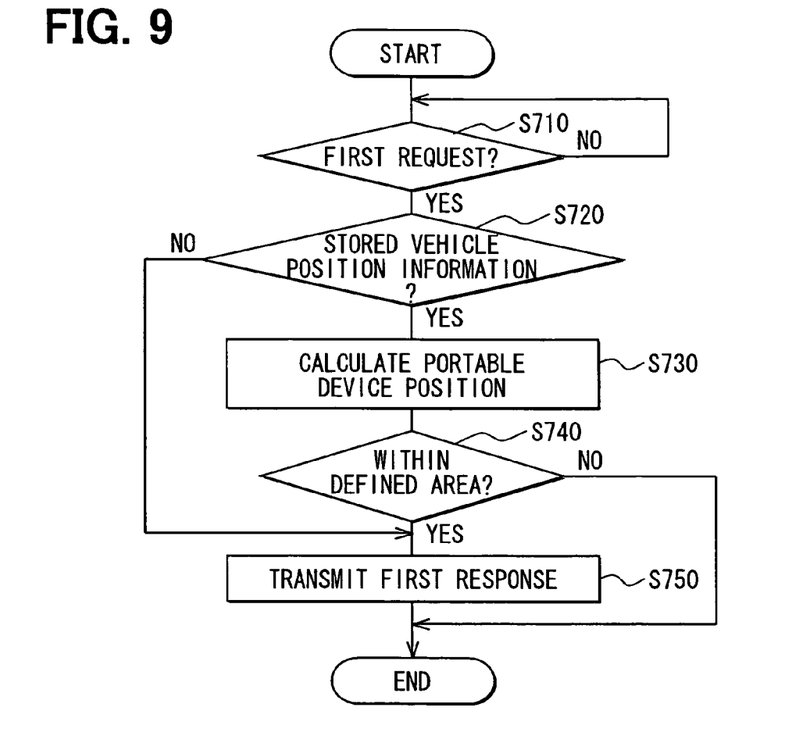
FIG. 9 is a flow chart showing processing executed in the portable device, in which the electronic key ECU performs control of the lock/unlock state of each door based upon the identification result of the ID code by interactive communication between the in-vehicle unit and the portable device for the vehicular device control system in the third embodiment.

In the normal processing of the portable device 1 shown in FIG. 9, at step S710, in the same way with the first embodiment, a determination is made as to presence/absence of reception of the request signal. In order to avoid confusion with the second and the third request signals, the request signal in the normal processing is defined as a first request signal.

Next, at step S720, it is determined whether the vehicle stop position information is stored in the memory. At this time point, when it is determined that the vehicle stop position information is not stored, the relation with the portable device position cannot be determined. Therefore, the process proceeds to step S750, wherein the first response signal in response to the first request signal is transmitted.

As described above, the stop position information is stored in synchronization with stop of the engine and is eliminated in synchronization with start of the engine. Accordingly, the state of no storage on the stop position information corresponds to a period from start of the engine to stop of the engine. In this case, it is considered that the portable device 1 is all the time placed in a position close to the vehicle 10. Therefore, when the stop position information is not stored, a particular problem does not occur even if the first response signal is transmitted without determining the relation between the portable device position and the stop position.

On the other hand, when it is determined at step S720 that the stop position information is stored, the process proceeds to step S730, wherein the position of the portable device 1 is calculated based upon GPS signals received by the GPS receiver 1c. In addition, it is determined at step S740 whether the stored stop position is within the defined area defined on the basis of the calculated portable device position. When the stored stop position is determined to be within the defined area in the determination processing, the received first request signal is assumed as an authorized request signal. Accordingly, at step S750, the transmission processing of the first response signal is executed. On the other hand, in a case where it is determined that the stored stop position of the vehicle is out of the defined area, there is the possibility that an interactive communication distance between the portable device 1 and the in-vehicle unit 10a is lengthened on purpose. Therefore, the transmission processing of the response signal is not executed and the processing shown in FIG. 9 ends.

According to the third embodiment, the portable device 1 is provided with the GPS receiver 1c for detecting the portable device position and the memory for storing the stop position information of the vehicle. Herein, when the vehicle stops the engine for the stop of the vehicle 10, the stop position usually does not change until a user drives the vehicle 10 again. Accordingly, when the portable device 1 stores the stop position and determines whether the stop position is within the defined area defined on the basis of the portable device position, it can be determined whether the portable device 1 is in the neighborhood of the stopped vehicle or at a place at far distances therefrom.

When the portable device 1 is positioned at a place remote from the vehicle 10, since the portable device 1 does not transmit the first response signal, it is surely prevented that the control of the lock/unlock state is performed in response to the response signal of the portable device 1 at far distances from the vehicle 10.

In the third embodiment the in-vehicle unit 10a transmits the stop position information of the vehicle 10 to the portable device 1 by including it in the third request signal. However, when the vehicle 10 stops due to stop of the engine, usually the portable device 1 is engaged in a predetermined position inside the vehicle compartment or is retained by a user in a vehicle. Accordingly, the portable device position detected by the GPS receiver 1c of the portable device 1 may be stored as a vehicle stop position.

In this case, the portable device 1 does not recognize when the engine stops and starts. Accordingly, the in-vehicle unit 10a may transmit the third request signal excluding the vehicle stop position to the portable device 1 for instructing memory of the vehicle stop position when the engine stops. When the engine starts, the in-vehicle unit 10a may transmit the second request signal for instructing elimination of the memory of the vehicle stop position to the portable device 1.

Fourth Embodiment

The vehicular device control system in the fourth embodiment differs from the vehicular device control system in the first embodiment in using the portable device position and the vehicle position as a part of a cipher. The processing of both the portable device 1 and the in-vehicle unit 10a in the fourth embodiment are shown in FIGS. 10 and 11.

Figure 10:
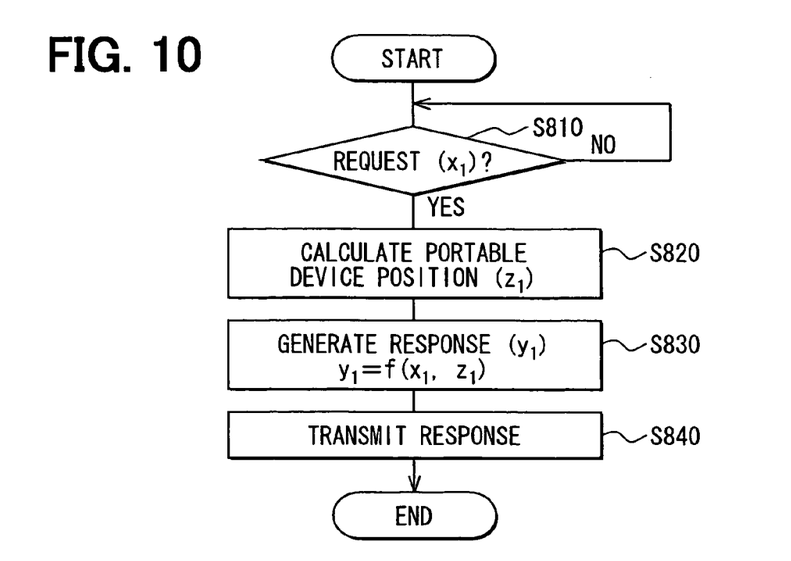
FIG. 10 is a flow chart showing processing executed in the portable device, in which the electronic key ECU performs control of the lock/unlock state of each door based upon the identification result of the ID code by interactive communication between the in-vehicle unit and the portable device for the vehicular device control system in a fourth embodiment of the present invention.
Figure 11:
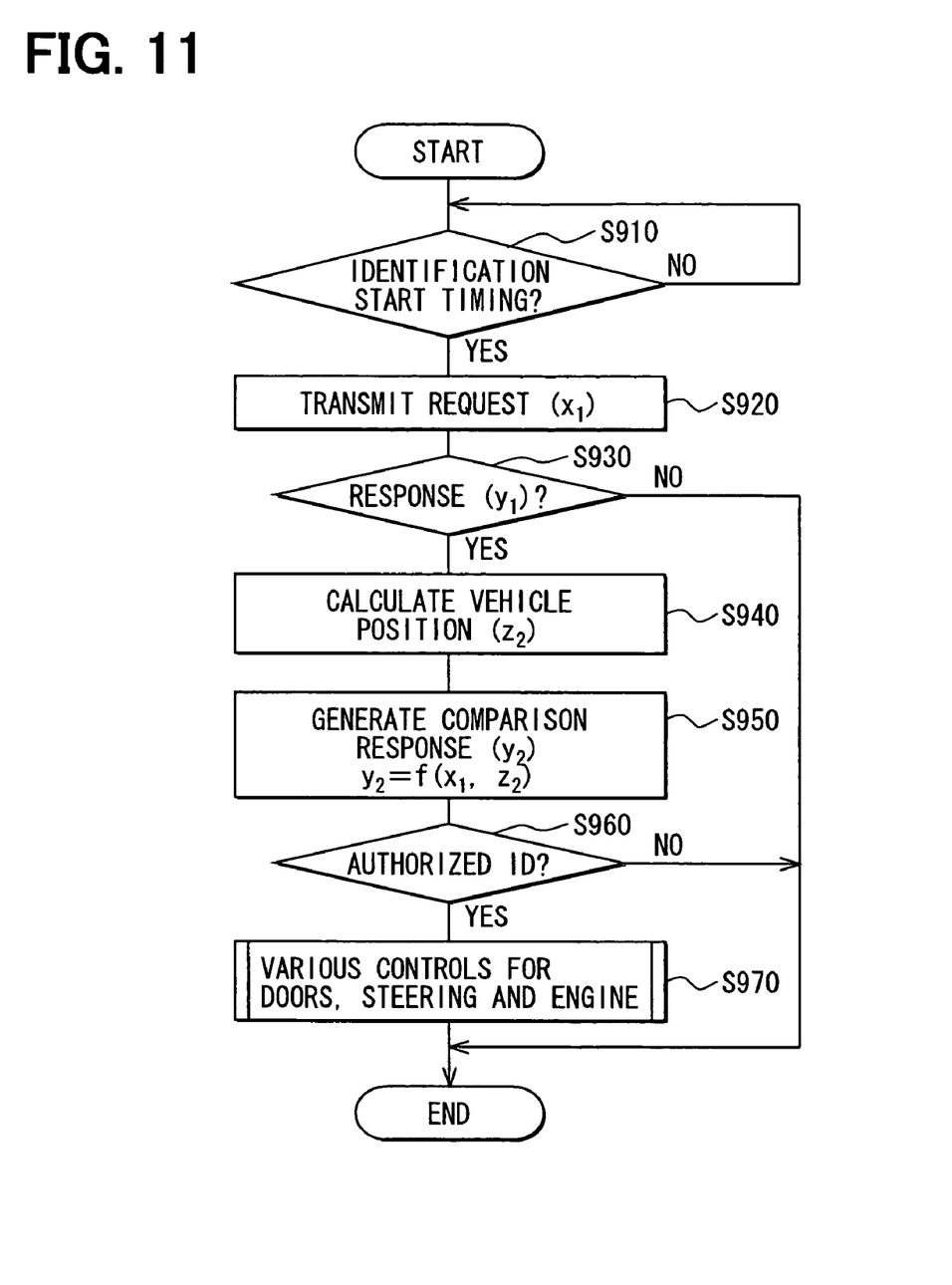
FIG. 11 is a flow chart showing processing executed in the in-vehicle unit, in which the electronic key ECU performs control of the lock/unlock state of each door based upon the identification result of the ID code by interactive communication between the in-vehicle unit and the portable device for the vehicular device control system in the fourth embodiment.

The processing shown in FIGS. 10 and 11 is mostly in common with the processing of the first embodiment. In the processing in the portable device 1 shown in FIG. 10, when it is determined at step S810 that a request signal (x) is received from the in-vehicle unit 10a, at subsequent step S820 the portable device 1 detects a portable device position ($z_1$) of the portable device 1 based upon GPS signals received by the GPS receiver 1c.

Further, at step S830 the portable device 1 generates a response signal ($y_1$) including an ID code. This may be made by setting the portable device position ($z_1$) calculated at step S820 as a part of a cipher. Then, at step S840 the portable device 1 transmits the response signal ($y_1$).

Next, the in-vehicle unit 10a executes processing shown in FIG. 11. At step S910 a determination is made as to timing for starting the identification of the ID code. More specially, when the engine of the vehicle 10 is stopped and the vehicle 10 is parked with each door 11 to 14 locked, it is determined for each elapse of a predetermined time that the vehicle state is in the start timing of the identification of the ID codes of the transmitters 2a to 2d, thereby instructing transmission of the request signal to the transmitters 2a to 2d. On the other hand, in regard to the transmitter 2e inside the vehicle compartment, starting timing of the engine, operating time of the door lock switch or the like is determined as starting timing of the identification of the ID code, instructing transmission of the request signal to the transmitter 2e.

At step S910, when it is determined that the vehicle state is not in the starting timing of the identification of the ID code, the in-vehicle unit 10a waits until the vehicle state becomes the starting timing of the identification. When it is determined that the vehicle state is in the starting timing of the identification of the ID code, the process proceeds to step S920, wherein a transmission instruction signal is outputted to the transmitters 2a to 2d and/or the transmitter 2e. This causes the transmitters 2a to 2d and/or the transmitter 2e to transmit the request signal ($x_1$).

At step S930 the response signal ($y_1$) is transmitted from the portable device 1 in response to the request signal, thus determining whether the response signal is received. When the response signal cannot be received, the processing shown in FIG. 11 ends by assuming that the portable device 1 is not within the detection area. On the other hand, when the response signal is received from the portable device 1, the process proceeds to step S940. The response signal ($y_1$) from the portable device 1 is made by coding the portable device position information ($z_1$) as a part of a cipher and includes the ID code.

At step S940 a stop position ($z_2$) of the vehicle is calculated based upon GPS signals received by the GPS receiver 9. In addition, at step S950, in order to determine whether a position of the vehicle 10 is within the defined area defined on the basis of the vehicle position and the received signal is an authorized response signal from the portable device 1, having a predetermined correspondence relation with the vehicle, a comparison response signal ($y_2$) including the ID code and made by coding the portable device position information ($z_1$) calculated at step S940 as a part of the cipher is generated.

At subsequent step S960, it is determined whether the identification of the ID code is YES, that is, whether the identification result is "identified (authorized)" or "not identified (not authorized)." That is, it is determined whether the response signal ($y_1$) received at step S930 and the comparison response signal ($y_2$) calculated at step S950 meet a predetermined correspondence relation. When it is determined that the response signal ($y_1$) and the comparison response signal ($y_2$) meet a predetermined correspondence relation, it is assumed that the position of the portable device 1 is within the defined area defined on the basis of the vehicle position and the received response signal ($y_1$) is an authorized response signal ($y_2$). Therefore, the process proceeds to step S970.

On the other hand, when the response signal ($y_1$) and the comparison response signal ($y_2$) do not meet a predetermined correspondence relation, there is the possibility that the interactive communication distance between the portable device 1 and the in-vehicle unit 10a is lengthened on purpose. Therefore, the processing shown in FIG. 11 ends and the control of the lock/unlock state of each door is not performed. At step S970, various controls such as control of a lock/unlock state of each door, control of a steering lock state, control of an engine start permission or the like are performed in accordance with conditions of the vehicle.

The fourth embodiment thus uses the portable device position ($z_1$) and the vehicle position ($z_2$) as a part of the cipher. Therefore, even if the plurality of additional communication devices are used for relay therebetween, unjust modifications of the response signal are prevented. This further surely prevents devices in the vehicle 10 from being controlled in response to the response signal of the portable device 1 at far distances from the vehicle 10.

Fifth Embodiment

Figure 12:
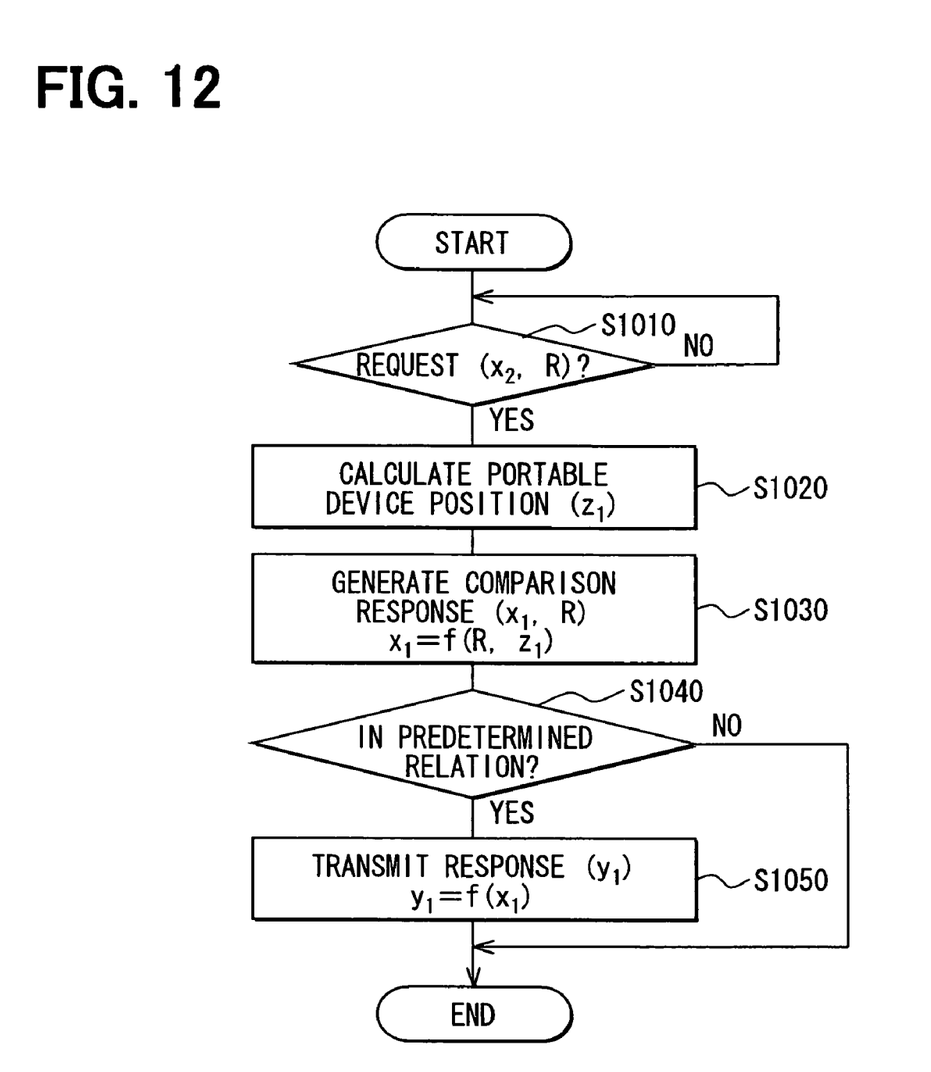
FIG. 12 is a flow chart showing processing executed in the portable device, in which the electronic key ECU performs control of the lock/unlock state of each door based upon the identification result of the ID code by interactive communication between the in-vehicle unit and the portable device for the vehicular device control system in a fifth embodiment of the present invention.

The vehicular device control system in the fifth embodiment differs from the vehicular device control system in the second embodiment in using the portable device position and the vehicle position as a part of a cipher. The processing of both the portable device 1 and the in-vehicle unit 10a in the fifth embodiment is shown in FIGS. 12 and 13 and is mostly in common with the processing of the second embodiment.

Figure 13:
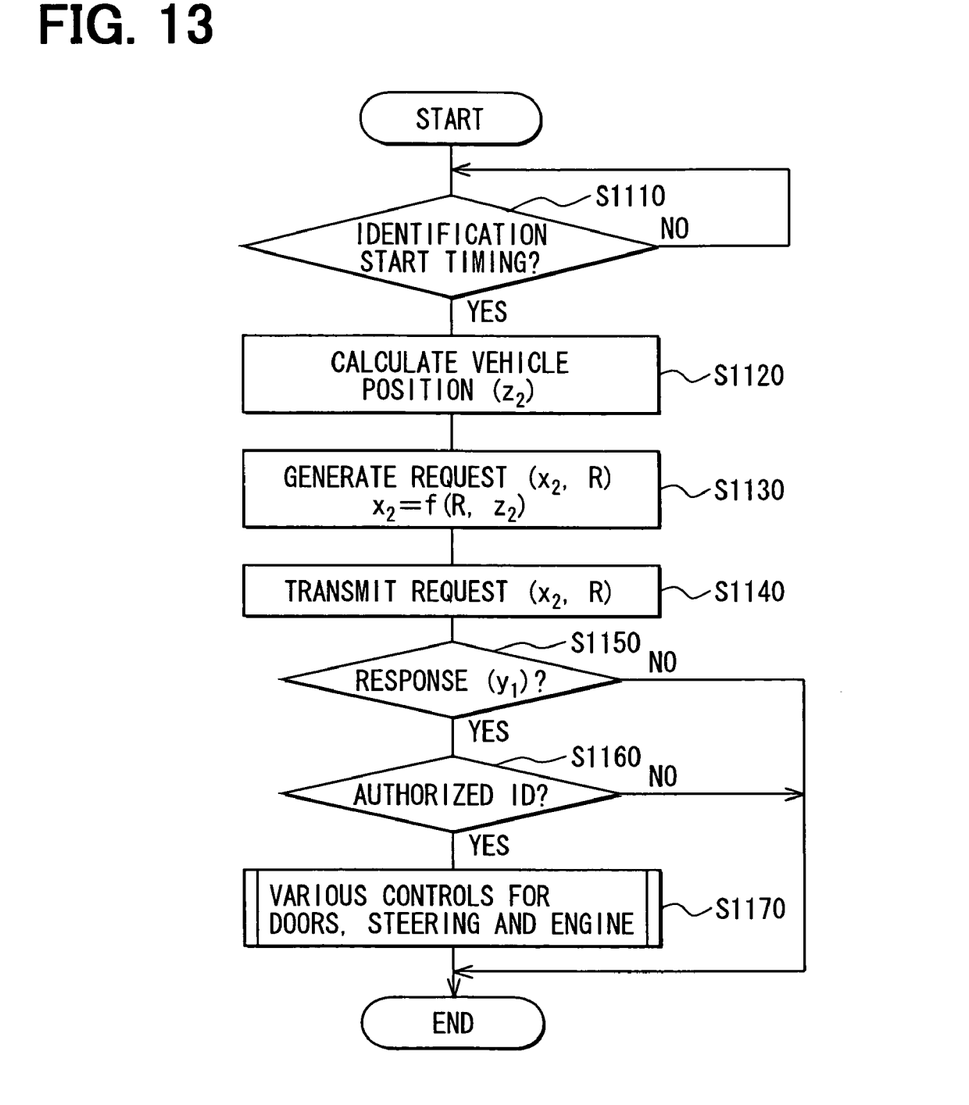
FIG. 13 is a flow chart showing processing executed in the in-vehicle unit, in which the electronic key ECU performs control of the lock/unlock state of each door based upon the identification result of the ID code by interactive communication between the in-vehicle unit and the portable device for the vehicular device control system in the fifth embodiment.

First, with reference to FIG. 13, when it is determined at step S1110 that the vehicle state is appropriate for timing for starting the identification of the ID code, at step S1120 the in-vehicle unit 10a detects a vehicle position ($z_2$) (vehicle position information) of the vehicle 10 based upon GPS signals received by the GPS receiver 9.

Further, at step S1130, in order to determine whether the position of the vehicle 10 is within the defined area around the vehicle position, a request signal ($x_2$, random number R) is generated by setting the vehicle position information ($z_2$) calculated at step S1120 as a part of a cipher. At step S1140, the generated request signal ($x_2$, R) is transmitted. Here, $x_2$ is defined as $x_2 = f(R, z_2)$.

At subsequent step S1150, when it is determined that the response signal ($y_1$) is received from the portable device 1, the process proceeds to step S1160, wherein it is determined whether the identification of the ID code transmitted from the portable device 1 is YES, that is, whether the identification result of the ID code is identified or not. When the identification result indicates that the ID code is the authorized one, the process proceeds to step S1170, wherein various controls such as control of the lock/unlock state of each door, control of the steering lock state, control of the engine start permission or the like are performed based upon conditions of the vehicle 10.

In the portable device 1, when it is determined at step S1010 that a request signal ($x_2$, random number R) is received from the in-vehicle unit 10a, at subsequent step S1020 the portable device 1 calculates a position ($z_1$) (portable device position information) of the portable device 1 based upon GPS signals received by the GPS receiver 1c.

However, in the fifth embodiment, the request signal received in the portable device 1 is made by coding the vehicle position information ($z_2$) as a part of the cipher, unlike the first embodiment.

At step S1030, in order to determine whether the position of the portable device 1 is within the defined area around the vehicle position, a comparison request signal ($x_1$, R) is generated. It is determined at step S1040 whether the request signal ($x_2$, R) received at step S1010 and the comparison request signal ($x_1$, R) calculated at step S1030 are in a predetermined correspondence relation.

In the determination processing at step S1040, when it is determined that the request signal ($x_2$, R) and the comparison request signal ($x_1$, R) meet a predetermined correspondence relation, it is assumed that the position of the portable device 1 is within the defined area of the vehicle position. Accordingly, at step S1050, the transmission processing of the response signal is performed.

On the other hand, when the request signal ($x_2$, R) and the comparison request signal ($x_1$, R) are not in the predetermined correspondence relation, there is the possibility that the interactive communication distance between the portable device 1 and the in-vehicle unit 10a is lengthened on purpose. Therefore, the processing shown in FIG. 12 ends.

The fifth embodiment thus uses the portable device position ($z_1$) and the vehicle position ($z_2$) as a part of the cipher. Therefore, when the portable device 1 is at far distances from the vehicle 10, even if the plurality of additional communication devices are used for relay therebetween, unjust modifications of the request signal are prevented. Therefore, the portable device 1 does not transmit the response signal in response to the request signal. This further surely prevents devices in a vehicle from being controlled in response to the response signal of the portable device 1 at far distances from the vehicle.

The present invention is not limited to those embodiments, but may be implemented in many other ways. For instance, it may be implemented as a control apparatus for controlling entry into a building, room and so on, or for controlling a remotely-controllable object such as electric appliances.

What is claimed is:

1. A vehicular device control system comprising:
    a portable device; and
    an in-vehicle unit provided in a vehicle for interactive communication with the portable device to control a device in the vehicle based upon a communication result,
    wherein the portable device includes:
        a portable device position detector for detecting a portable device position;
        a portable device-side receiver for receiving a request signal from the in-vehicle unit; and
        a portable device-side transmitter for transmitting a response signal including an ID code thereof and the position of the portable device in response to the request signal, and
    wherein the in-vehicle unit includes:
        a vehicle-side transmitter for transmitting the request signal to the portable device;
        a vehicle-side receiver for receiving the response signal transmitted from the portable device-side transmitter;
        a vehicle position detector for detecting a vehicle position;
        determination means which determines whether the portable device position included in the response signal is within a predetermined area defined on a basis of the vehicle position; and
        control means which, when the portable device position is within the predetermined area, controls the device in the vehicle in accordance with an identification result of the ID code included in the response signal.

2. The vehicular device control system according to claim 1, wherein the device for the vehicle includes at least one of devices for controlling a vehicle door and a vehicle engine.

3. A vehicular device control system comprising:
    a portable device; and
    an in-vehicle unit provided in a vehicle for interactive communication with the portable device to control a device in the vehicle based upon a communication result,
    wherein the in-vehicle unit includes:
        a vehicle position detector for detecting a vehicle position;
        a vehicle-side transmitter for transmitting a request signal including the vehicle position detected by the vehicle position detector to the portable device;
        a vehicle-side receiver for receiving a response signal transmitted from the portable device; and
        control means which performs identification of an ID code included in the response signal to control the device of the vehicle in accordance with an identification result, and
    wherein the portable device includes:
        a portable device position detector for detecting a position of the portable device;
        a portable device-side receiver for receiving the request signal;
        determination means which determines whether the vehicle position included in the request signal is within a predetermined area defined on a basis of the portable device position detected by the portable device position detector; and a portable device-side transmitter which, when the determination means determines that the vehicle position is within the predetermined area, transmits the response signal including the ID code.

4. The vehicular device control system according to claim 3, wherein the device for the vehicle includes at least one of devices for controlling a vehicle door and a vehicle engine.

5. A vehicular device control system comprising:

a portable device; and an in-vehicle unit provided in a vehicle for interactive communication with the portable device to control a device in the vehicle based upon a communication result, wherein the in-vehicle unit includes:

a vehicle-side transmitter for transmitting a request signal and a storage instruction signal for instructing memory of a vehicle stop position at an engine stop time of the vehicle;

a vehicle-side receiver for receiving a response signal transmitted from the portable device; and control means which performs identification of an ID code included in the response signal to control the device of the vehicle, and wherein the portable device includes:

a portable device position detector for detecting a position of the portable device;

a portable device-side receiver for receiving the request signal and the storage instruction signal;

a vehicle stop position memory for storing a stop position of the vehicle in response to the storage instruction signal;

determination means which determines whether the stop position stored in the vehicle stop position memory is within a predetermined area defined on a basis of the portable device position detected by the portable device position detector when the portable device-side receiver receives the request signal; and a portable device-side transmitter which, when the determination means determines that the stop position is within the predetermined area, transmits the response signal including the ID code.

6. The vehicular device control system according to claim 5, wherein:

the in-vehicle unit includes a vehicle position detector for detecting a vehicle position;

the vehicle-side transmitter transmits the vehicle position as the stop position of the vehicle when the engine stops and also the storage instruction signal; and the vehicle stop position memory stores the stop position of the vehicle received by the portable device-side receiver.

7. The vehicular device control system according to claim 5, wherein:

the vehicle-side transmitter transmits an elimination instruction signal for instructing elimination of the stop position of the vehicle stored in the vehicle stop position memory when the engine starts; and the stop position memory eliminates the stop position of the vehicle when the portable device-side receiver receives the elimination instruction signal.

8. The vehicular device control system according to claim 3, wherein the device for the vehicle includes at least one of devices for controlling a vehicle door and a vehicle engine.

9. A vehicular device control system comprising:

a portable device; and an in-vehicle unit provided in a vehicle for interactive communication with the portable device to control a device in the vehicle based upon a communication result, wherein the portable device includes:

a portable device position detector for detecting a portable device position;

a portable device-side receiver for receiving a request signal from the in-vehicle unit; and a portable device-side transmitter for transmitting a response signal including an ID code and made by coding the portable device position as a part of a cipher, and wherein the in-vehicle unit includes:

a vehicle-side transmitter for transmitting the request signal to the portable device;

a vehicle-side receiver for receiving the response signal transmitted from the portable device-side transmitter;

a vehicle position detector for detecting a position of the vehicle;

determination means which calculates a comparison response signal made by coding the vehicle position as a part of a cipher to determine whether the comparison response signal and the response signal received by the vehicle-side receiver are in a predetermined correspondence relation; and control means which controls the device in the vehicle when the determination means determines that the comparison response signal and the response signal are in the predetermined correspondence relation.

10. The vehicular device control system according to claim 9, wherein the device for the vehicle includes at least one of devices for controlling a vehicle door and a vehicle engine.

11. A vehicular device control system comprising:

a portable device; and an in-vehicle unit provided in a vehicle for interactive communication with the portable device to control a device in the vehicle based upon a communication result, wherein the in-vehicle unit includes:

a vehicle position detector for detecting a vehicle position;

a vehicle-side transmitter for transmitting a request signal made by coding the vehicle position as a part of a cipher;

a vehicle-side receiver for receiving a response signal transmitted from the portable device; and control means which performs identification of an ID code included in the response signal to control the device of the vehicle based upon an identification result, and wherein the portable device includes:

a portable device position detector for detecting a portable device position;

a portable device-side receiver for receiving the request signal;

determination means which calculates a comparison request signal made by coding the portable device position as a part of a cipher to determine whether the comparison request signal and the request signal are in a predetermined correspondence relation; and a portable device-side transmitter which, when the determination means determines that the comparison request signal and the request signal are in the predetermined correspondence relation, transmits the response signal including the ID code.

12. The vehicular device control system according to claim 11, wherein the device for the vehicle includes at least one of devices for controlling a vehicle door and a vehicle engine.

* * * * *